Patented Aug. 27, 1946

2,406,573

UNITED STATES PATENT OFFICE 2,406,573

EXPLOSIVE AND PROCESS OF MAKING

Walter W. Vogl, Omaha, Nebr., assignor to Ralph E. Svoboda

No Drawing. Application August 17, 1942, Serial No. 455,126

5 Claims. (Cl. 260—583)

The present invention relates to a novel explosive and to a process of making same, in which a part of the $NH_2$ group of ethylene diamine is combined with perchloric acid and another part thereof is combined with a polynitroaromatic compound. An important example of such being ethylene diamine perchloratepicrate. Instead of the picric acid (trinitrophenol) compound other compounds such as that of trinitrocresol and certain other bodies can be produced in a similar manner.

These explosives are suitable for use as bursting charges in missiles, as boosters, for reinforced detonators, detonating fuses, etc.

Perchlorates of ethylene diamine and of certain related bodies, and methods of producing the same, are discussed in my copending application Serial No. 397,968, filed June 13, 1941.

In the present invention, ethylene diamine perchlorate in which not all of the amino group (basic nitrogenous group) present is joined to perchloric acid, is treated with trinitrophenol (picric acid) or a homologue, or other polynitro aromatic bodies which contain a hydroxyl group. Or instead, certain other active groups may be present in place of the hydroxyl group. Examples of such other substances are sulfonic acids, diazo-compounds, and polynitro-compounds of highly acid character, etc.

Taking trinitrophenol as typical, this can act as an acid (it is commonly called picric acid) and being an acid of sufficient reactivity, it is capable of reacting with the amine (joining the —$NH_2$ group by addition). Hence, not all of the $NH_2$ groups of the ethylene diamine are combined with perchloric acid. Thus it is possible to react one mole of perchloric acid with one mole of ethylene diamine, forming ethylene diamine monoperchlorate, and to then react this with one mole of picric acid or a homologue thereof.

To further explain the nature of the invention and to teach practical embodiments of the same, I give the following examples (to the details of which the invention is in no way restricted). The parts are by weight.

Example 1.—200 parts of perchloric acid solution (of 50% strength) are mixed with 60 parts of ethylene diamine. From the solution 80 parts of water are evaporated. This reaction gives ethylene diamine monoperchlorate, which still contains one reactive $NH_2$ group. To the concentrated product, 285 parts of trinitrophenol, containing 15% of water, are added. The water content of the reaction product is then evaporated and the material dried at temperatures up to about 140° C., or at a lower temperature in a vacuum.

It will be observed that the figures given in this example correspond to 1 mole of the diamine, 1 mole of perchloric acid and slightly over 1 mole of picric acid. The resulting product is principally a reaction product in which one $NH_2$ group of the diamine is combined with perchloric acid and the other $NH_2$ group is combined with picric acid. This product is an explosive.

The resulting explosive is of greenish brown color and has a high velocity of detonation.

Example 2.—To 80 kg. of dry ethylene diamine monoperchlorate 121 kg. of trinitrocresol are added and the mixture slowly heated to 130° C. The amounts of the two materials are substantially equimolar. The trinitrocresol (being a homologue of picric acid) reacts with the free amino group of the monoperchlorate in a manner wholly analogous to the reaction of picric acid in Example 1.

In my researches on this subject matter, I have demonstrated that a perchlorate of ethylene diamines, which still contains a reactive $NH_2$ group, can be caused to react with numerous polynitroaromatic bodies of an acid nature, to form explosives which have highly useful properties.

It will be understood that I do not restrict myself to the use of such a proportion of perchloric acid as will combine with exactly one $NH_2$ group. Nor do I restrict the invention to the specific materials used.

The prefix "poly" as employed herein is intended to include a plurality, and is not restricted to at least three.

I claim:

1. An explosive containing as its essential constituent a compound of ethylene diamine in which one amino group of the diamine is linked to perchloric acid and the second amino group is combined with a polynitroaromatic body of acid character.

2. An explosive containing as its essential constituent a compound of ethylene diamine in which one amino group is linked to perchloric acid and the other amino group is combined with a trinitro phenolic body of acid character.

3. An explosive containing as its essential constituent a compound of ethylene diamine in which one amino group is linked to perchloric acid and the other amino group is combined with picric acid.

4. An explosive containing as its essential constituent a compound of ethylene diamine in which one amino group is linked to perchloric acid and the other amino group is combined with trinitrocresol.

5. A process of producing an explosive which comprises reacting perchloric acid on ethylene diamine, the amount of said perchloric acid being substantially less than the amount needed to combine with all the $NH_2$ groups, and reacting upon the product with a polynitroaromatic compound of an acid character.

WALTER W. VOGL.